Oct. 7, 1941.     A. C. HOLLATZ     2,258,008
STUFFING BOX
Filed Oct. 20, 1939
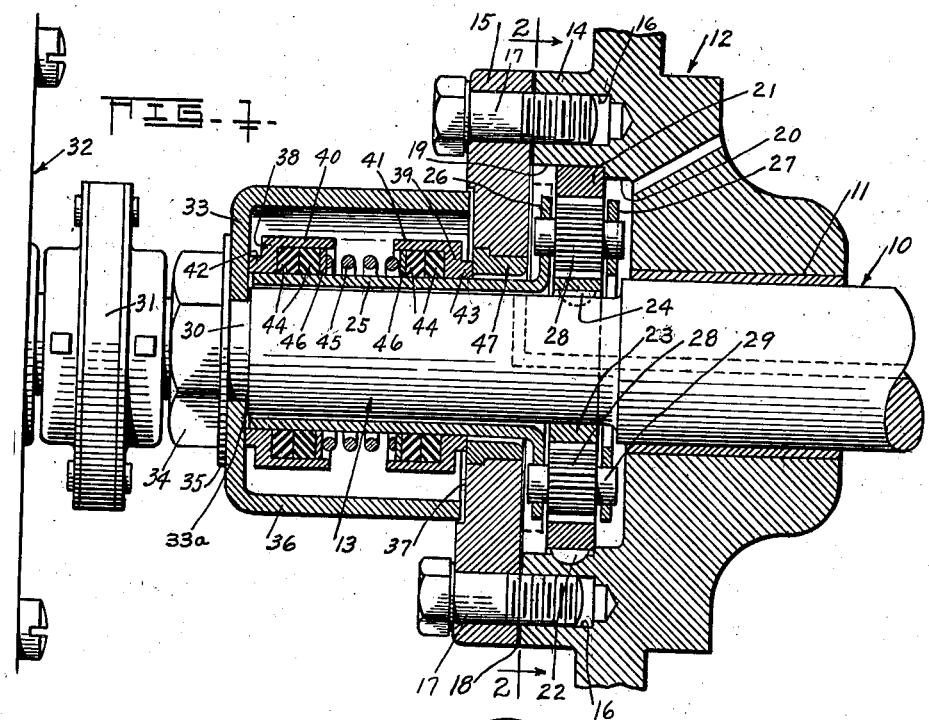
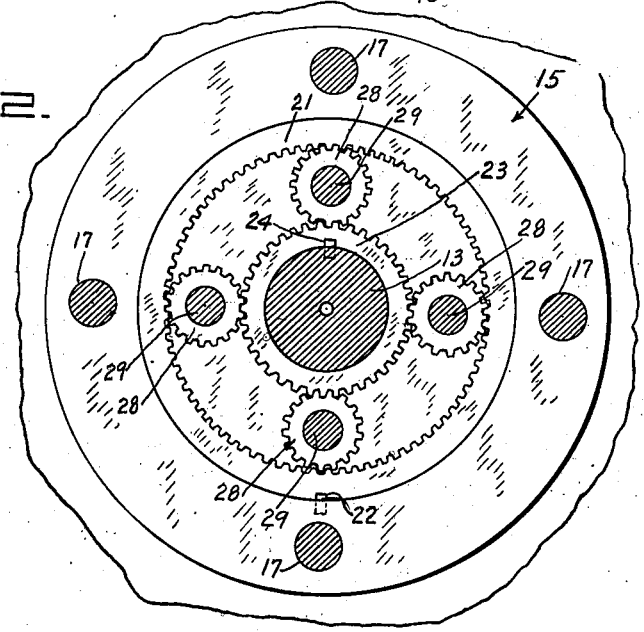
INVENTOR.
ARTHUR C. HOLLATZ
BY
ATTORNEYS.

Patented Oct. 7, 1941

2,258,008

UNITED STATES PATENT OFFICE 2,258,008

STUFFING BOX

Arthur C. Hollatz, Bloomington, Ill., assignor to Williams Oil-O-Matic Heating Corporation, Bloomington, Ill., a corporation of Illinois Application October 20, 1939, Serial No. 300,331

9 Claims. (Cl. 286—7)

This invention relates to a stuffing box and has special reference to a device adapted to provide a liquid or gaseous seal about a shaft rotating therein.

More particularly, this invention relates to a stuffing box for a rotatable shaft comprising a plate rotatable with respect to the shaft and another plate stationary with respect to the shaft, there being a sleeve loosely mounted on the rotatable shaft between the fixed and rotatable plates with sealing means frictionally mounted on the sleeve to rotate therewith. The sealing means has contact with the rotatable and stationary plates to form sealed surfaces thereat, and power transmitting means, actuated by the rotation of the rotatable shaft, imparts rotation to the sleeve at a reduced speed relative to the speed of the rotatable shaft to provide a reduced seal surface speed.

In compressors for refrigerating apparatus or the like or other devices in which a rotating shaft passes through a housing wherein the pressure is greater upon one side than upon the other, it is desirable, and usually necessary, to provide a seperate device to effect a seal on the shaft. It is desirable on a high speed shaft to form a gas- and liquid-tight seal therefor without creating any undue friction upon the contacting parts. The shaft, ordinarily running at standard motion speed, may cause excessive wear of the contacting parts to effect the sealing qualities thereof.

The present invention contemplates the provision of a construction wherein one portion of a sealing means contacts with the stationary plate and the other portion with the rotating plate through both of which the rotatable shaft passes, the sealing means being carried by a sleeve rotated by a power transmitting means which latter is, in turn, actuated by the rotatable shaft to impart rotation to the sleeve at a reduced speed relative to the speed of the shaft. The rotation of the sleeve at reduced speed causes one portion of the sealing means to coact with the stationary plate at reduced surface speed while the other portion of the sealing means coacts with the rotating plate revolving in the same direction at greater speed to cause substantially the same seal surface speed operation as the first mentioned portion of the sealing means.

One of the objects of this invention is to provide a stuffing box of the character described for use with a rotatable shaft wherein a positive and reduced seal surface speed of the contacting parts is provided on a high speed shaft.

Another object of this invention is to provide a stuffing box of the type hereinabove noted for a rotatable shaft which is comparatively inexpensive to manufacture, is efficient and simple in operation, and is durable.

Other objects and advantages of this invention will hereinafter be more particularly pointed out and, for a more complete understanding of the characteristic features of this invention, reference may now be had to the following description when taken together with the accompanying drawing, in which latter:

Figure 1 is a central vertical sectional view partially in elevation of a stuffing box associated with a rotatable shaft of a compressor, the shaft being connected by a coupling to a motor shown fragmentarily; and Fig. 2 is a sectional view taken on the line 2—2 of Fig. 1.

Referring now more particularly to the drawing, a rotatable shaft 10 is mounted in a bushing 11 of the bearing of a compressor 12, the shaft 10 having a reduced extension 13 extending outwardly beyond the bushing 11. The housing shown in Fig. 1 as comprising a portion of the compressor has a ring-shaped projection 14 extending from an external face thereof to which is fixed a stationary plate 15, the projection 14 having a plurality of spaced threaded apertures 16 for receiving bolts 17 extending through apertures in the stationary plate 15. A gasket 18 is preferably disposed between the faces of the plate 15 and the projection 14 to provide a sealed relation therebetween.

The ring-shaped projection 14 provides a recess 19 in the external face of the housing 12 with a reduced extension 20 thereof forming a shoulder against which an internal ring gear 21 rests. The internal ring gear 21 is fixed against rotation with respect to the housing of the compressor 12 by means of a key 22 disposed in registering slots of the housing an internal ring gear.

A ring gear 23 is fixedly mounted on the extension 13 of the rotatable shaft 10 by any suitable means such, for example, as the key 24 engaged in registering slots of the ring gear and shaft. The ring gear 23 preferably lies in the plane of the internal ring gear 21. A sleeve 25 is loosely mounted on the reduced extension 13 of the rotatable shaft 10 for independent rotatable movement thereof, the sleeve being provided with an outwardly extending peripheral flange 26 co-operating with a ring 27 spaced therefrom for the support of a plurality of pinion gears 28 disposed in the space therebetween. The pinion gears are mounted on stud shafts 29 rotatably mounted in apertures forming bearings in the flanges and ring 26 and 27, respectively. The pinion gears 28 operatively engage both the internal ring gear 21 and the ring gear 23.

The reduced extension 13 of the rotatable shaft 10 is still further reduced as at 30 for connection with a coupling 31, the coupling connecting a motor 32 with the rotatable shaft 10. The motor 32, therefore, through the coupling 31, operates the rotatable shaft 10 of the compressor 12. It is to be understood, of course, that the rotatable shaft 10 may be a part of any mechanism requiring a seal to the atmosphere or to another chamber and that this invention, of course, is not limited to a motor-operated compressor.

A plate 33 is fixedly secured to the threaded reduced extension 30 to rotate therewith and with the rotatable shaft 10, the plate being held in position adjacent a sealing gasket 33a, which latter, in turn, rests against the shoulder formed at the juncture of the reduced extension 30 with the reduced extension 13. A nut 34 acting against a washer 35 holds the plate and sealing gasket in an assembled relation on the reduced extension. A peripheral flange 36 extends from the plate 33 in a direction substantially parallel to the axis of the rotatable shaft 10 to form with the plate 33 a substantially cup-shaped cover for extending over the sleeve 25 and for confining the sealing means hereinafter to be described. The peripheral flange 36 extends from the plate 33 to within a recess 37 in the outer face of the plate 15.

A sealing means is frictionally mounted on the sleeve 25 to rotate therewith, the sealing means comprising spaced rings 38 and 39 movably mounted on the loosely mounted sleeve 25. Flanges 40 and 41 are fixedly mounted on the rings 38 and 39, respectively, to extend therefrom in a direction inwardly toward each other in a spaced relation with the sleeve 25. Flanges 42 and 43 are also mounted on the rings 38 and 39, respectively, to extend, however, in a direction outwardly and away from each other, the ends of the flanges 42 and 43 having contact with the plates 33 and 15, respectively, to form sealed surfaces thereat.

In order that the rings 38 and 39 rotate with the sleeve 25 a plurality of resilient or compressible washers 44 are disposed on the sleeve 25 for frictional engagement therewith, the outer peripheries of the washers engaging, respectively, the internal peripheral surfaces of the flanges 40 and 41. A compression spring 45 is disposed over the sleeve 25 to urge the sealing members in a direction outwardly from each other so that the flanges 42 and 43 have a wiping contact with the plates 33 and 15, respectively, to form sealed surfaces. A thin metal washer 46 is disposed adjacent each end of the compression spring 45 to prevent damage to the washers 44.

The washers 44 are preferably formed of a resilient or compressible material such as rubber or a rubber composition, so that the compression of the spring, aside from urging the flanges 42 and 43 into a wiping contact with their respective plates, also expands the washers 44 into contact with the inner peripheral surfaces of the flanges 40 and 41 so that frictional engagement thereof is obtained between the sleeve 25 and the flanges 40 and 41, respectively, in order that the rings 38 and 39 rotate with the sleeve. The plate 15 is preferably provided with a bushing 47 forming a part thereof, against which the flange 43 of the ring 39 engages. In order to obtain a wiping contact to form a sealed surface, the contacting surfaces of the flange 42 and the plate 33 and of the flange 43 and bushing 47 are accurately machined and fitted. The provision of the bushing 47 as a separate element of the plate 15 makes it more economical to obtain and to maintain a sealed relation.

The rotation of the ring gear 23 on the reduced extension 13 of the rotatable shaft 10 in co-operation with the stationary internal gear 21 causes the pinion gears 28 to revolve the flanged sleeve 25 at a speed which may be predetermined by the size of the gears employed. A rotation of the sleeve 25 at reduced speed causes the flange 43 to contact the stationary plate at reduced face speed while the flange 42, co-operating with the revolving plate 33 which revolves in the same direction at greater speed, causes in the embodiment illustrated the same seal face speed operation as that between the flange 43 and the bushing 47 of the plate 15. The above construction and arrangement reduces the seal surface speed on a high speed shaft in order to obviate any excessive wear to effect the sealing qualities thereof.

While but a single embodiment of this invention is herein shown and described, it is to be understood that various modifications thereof may be apparent to those skilled in the art without departing from the spirit and scope of this invention and, therefore, the same is only to be limited by the scope of the prior art and the appended claims.

I claim:

1. A stuffing box for a rotatable shaft comprising a stationary plate, a rotatable plate fixed to said shaft, a sleeve loosely mounted on said rotatable shaft between said fixed and rotatable plates, sealing means frictionally mounted on said sleeve to rotate therewith, said sealing means having contact with said rotatable and stationary plates to form sealed surfaces thereat, and power transmitting means actuated by the rotation of said rotatable shaft to impart rotation to said sleeve at a reduced speed relative to the speed of said rotatable shaft to provide a reduced seal surface speed.

2. A stuffing box for a rotatable shaft comprising a stationary plate having an aperture through which said shaft extends, a rotatable cup-shaped cover fixed to said shaft, a sleeve loosely mounted on said rotatable shaft between said fixed plate and said rotatable cover, sealing means frictionally housed within said cover and mounted on said sleeve to rotate therewith, said sealing means having contact with said rotatable cover and said stationary plate to form sealed surfaces thereat, and power transmitting means actuated by the rotation of said rotatable shaft to impart rotation to said sleeve at a reduced speed relative to the speed of said rotatable shaft to provide a reduced seal surface speed.

3. A stuffing box for a rotatable shaft comprising a stationary plate having an aperture through which said shaft extends, a rotatable plate fixed to said shaft, a sleeve loosely mounted on said rotatable shaft between said fixed and rotatable plates, spaced sealing rings frictionally mounted on said sleeve to rotate therewith, said sealing rings having contact with said rotatable and stationary plates to form sealed surfaces thereat, and power transmitting means actuated by the rotation of said rotatable shaft to impart rotation to said sleeve at a reduced speed relative to the speed of said rotatable shaft to provide a reduced seal surface speed.

4. A stuffing box for a rotatable shaft comprising a stationary plate having an aperture through which said shaft extends, a rotatable plate fixed to said shaft, a sleeve loosely mounted on said rotatable shaft between said fixed and rotatable plates, spaced cup-shaped sealing rings frictionally mounted on said sleeve to rotate therewith, said sealing means having contact with said rotatable and stationary plates to form sealed surfaces thereat, resilient means between said cup-shaped sealing rings for normally exerting a pressure on said rings against said plates, and power transmitting means actuated by the rotation of said rotatable shaft to impart rotation to said sleeve at a reduced speed relative to the speed of said rotatable shaft to provide a reduced seal surface speed.

5. A stuffing box for a rotatable shaft comprising a stationary plate having an aperture through which said shaft extends, a rotatable plate fixed to said shaft, a stationary internal ring gear, a sleeve loosely mounted on said rotatable shaft between said fixed and rotatable plates, a plurality of pinion gears mounted on said sleeve for engagement with said internal ring gear, a ring gear fixedly mounted on said rotatable shaft for engaging said pinion gears, and sealing means frictionally mounted on said sleeve to rotate therewith, said sealing means having contact with said rotatable and stationary plates to form sealed surfaces thereat, said ring gear being actuated by the rotation of said rotatable shaft to impart rotation to said sleeve through said pinion gears and said stationary internal ring gear at a reduced speed relative to the speed of said rotatable shaft to provide a reduced seal surface speed.

6. A stuffing box for a rotatable shaft comprising a stationary plate having an aperture through which said shaft extends, an internal ring gear fixed with respect to said stationary plate, a rotatable plate fixed to said shaft, a flanged sleeve loosely mounted on said rotatable shaft between said fixed and rotatable plates, sealing means frictionally mounted on said sleeve to rotate therewith, a plurality of pinion gears rotatably mounted on the flange of said sleeve, said sealing means having contact with said rotatable and stationary plates to form sealed surfaces thereat, and a ring gear on said rotatable shaft and movable therewith to impart rotation to said sleeve through said pinion and internal ring gears at a reduced speed relative to the speed of said rotatable shaft to provide a reduced seal surface speed.

7. A stuffing box for a compressor or the like including a housing and a rotatable shaft mounted in a bearing therein, a stationary plate fixed to said housing and having an aperture through which said rotatable shaft extends, a cover fixed to said shaft and rotatable therewith, a sleeve loosely mounted on said rotatable shaft and rotatable independently thereof, sealing means frictionally mounted on said sleeve to rotate therewith, said sealing means having contact respectively with said rotatable and stationary plates to form sealed surfaces thereat, and power transmitting means actuated by the rotation of said rotatable shaft to impart rotation to said sleeve at a reduced speed relative to the speed of said rotatable shaft to provide a reduced seal surface speed.

8. A stuffing box for a compressor or the like including a housing and a rotatable shaft mounted in a bearing therein, a stationary plate fixed to said housing and having an aperture through which said rotatable shaft extends, an internal ring gear fixed to said housing, a cover fixed to said shaft and rotatable therewith, a flanged sleeve loosely mounted on said rotatable shaft and rotatable independently thereof, sealing means within said cover and frictionally mounted on said sleeve to rotate therewith, a plurality of pinion gears rotatably mounted on the flange of said sleeve, said sealing means having contact with said cover and said stationary plate to form sealed surfaces thereat, and a ring gear on said rotatable shaft and movable therewith to impart rotation to said sleeve through said pinion and internal ring gears at a reduced speed relative to the speed of said rotatable shaft to provide a reduced seal surface speed.

9. A stuffing box for a compressor or the like including a housing and a rotatable shaft mounted in a bearing therein, a stationary plate fixed to said housing and having an aperture through which said rotatable shaft extends, a cover fixed to said shaft and rotatable therewith, a sleeve loosely mounted on said rotatable shaft and rotatable independently thereof, spaced rings movably mounted on said loosely mounted sleeve, a flange fixedly mounted on each of said rings to extend therefrom inwardly in a direction toward each other in a spaced relation with said sleeve, spaced resilient discs within said cover and frictionally mounted on said sleeve to rotate therewith, spring means between said spaced resilient discs for compressing said discs against said rings thereby forcing a frictional engagement thereof with the flanges of said rings, said rings having contact with said cover and said stationary plate to form sealed surfaces thereat, and power transmitting means actuated by the rotation of said rotatable shaft to impart rotation to said sleeve at a reduced speed relative to the speed of said rotatable shaft to provide a reduced seal surface speed.

ARTHUR C. HOLLATZ.